US007859418B2

(12) United States Patent
Greene

(10) Patent No.: US 7,859,418 B2
(45) Date of Patent: Dec. 28, 2010

(54) APPARATUS, SYSTEM AND METHOD FOR SENSING TO LOCATE PERSONS IN A BUILDING IN THE EVENT OF A DISASTER

(76) Inventor: Morton Greene, 20693 Glenbrook Ter., Potomac Falls, VA (US) 20165

( * ) Notice: Subject to any disclaimer, the term of this patent is extended or adjusted under 35 U.S.C. 154(b) by 0 days.

(21) Appl. No.: 12/218,392

(22) Filed: Jul. 15, 2008

(65) Prior Publication Data

US 2010/0013640 A1 Jan. 21, 2010

(51) Int. Cl.
*G05B 23/02* (2006.01)
*G08B 23/00* (2006.01)
*G08B 5/22* (2006.01)

(52) U.S. Cl. ................ 340/573.1; 340/3.1; 340/825.36; 340/825.49

(58) Field of Classification Search .................. 340/3.1, 340/505, 506, 500, 502, 539.1, 539.11–539.19, 340/573.1, 825.36, 825.49; 455/404.2
See application file for complete search history.

(56) References Cited

U.S. PATENT DOCUMENTS 5,062,151 A * 10/1991 Shipley ...................... 398/108
5,903,217 A * 5/1999 Stanczak et al. ............ 340/554
5,977,913 A * 11/1999 Christ ........................ 342/465
6,307,475 B1 * 10/2001 Kelley ...................... 340/573.1
7,088,236 B2 * 8/2006 Sorensen .............. 340/539.13
7,170,407 B2 * 1/2007 Wagner ................. 340/539.13
2004/0090864 A1 * 5/2004 Larosa et al. ............... 367/124
2004/0100377 A1 * 5/2004 Brackett et al. ........ 340/539.13
2005/0007251 A1 * 1/2005 Crabtree et al. ........ 340/539.13
2006/0197658 A1 * 9/2006 Light et al. ............ 340/539.23
2007/0252692 A1 * 11/2007 Wallace et al. ......... 340/539.26
2008/0001735 A1 * 1/2008 Tran ...................... 340/539.22

* cited by examiner

*Primary Examiner*—Jennifer Mahmood
(74) *Attorney, Agent, or Firm*—Drinker Biddle & Reath LLP

(57) ABSTRACT

An apparatus, system and method that assesses the number and location of persons in a building. The invention may include none, one, two or more emitters, at least one sensor that senses reflected radiation indicative of a modification to the emitted radiation from multiple ones of the at least two emitters, and a communicative network, wherein sensing data from the at least one doppler sensor is forwarded to a remote central hub that manipulates the sensing data to an indication of the number and the location of the persons in the building. The sensors of the present invention may be, for example, doppler sensors, or any like sensor that senses biologically caused fluctuations within a monitored environment.

22 Claims, 6 Drawing Sheets

APPARATUS, SYSTEM AND METHOD FOR SENSING TO LOCATE PERSONS IN A BUILDING IN THE EVENT OF A DISASTER

BACKGROUND OF THE INVENTION

1. Field of the Invention

The present invention is directed to remote sensing and, more particularly, to an apparatus, system and method for sensing to locate persons in a building in the event of a disaster.

2. Description of the Background

In the existing art, buildings are typically designed with disaster avoidance in mind, that is, buildings are designed to withstand certain types of disasters. However, as was evidenced by the terrorist attacks in New York City on Sep. 11, 2001, if disasters not envisioned by the designers of the buildings occur, the results can be catastrophic. Nonetheless, the existing art necessitates that disaster types, and therefore effects, be known in advance in order to save lives. Further, the present art offers no way to assess, in the event of an unexpected disaster, what design effects perform best in the event to save lives.

Additionally, at present, although some larger buildings do have security that tracks the total number of people in a building, or event the approximate number of people on a floor or group of floors of the building, it is rare that building management has any methodology whereby it can even approximate where people are within the building. Yet further, any methodology whereby the precise location of people within the building can be tracked is non-existent.

The lack of any such precise tracking technology is shocking in view of recent events, and particularly terrorist events, in which non-survivors took months to locate, and in which some survivors were similarly deemed non-survivors for months after such events. Needless to say, such confusion would be remedied by a system that gave the precise locations of all persons within the building at the moment of any event.

Finally, again in view of recent events, the available art fails to provide a methodology whereby first responders can be informed of where to focus life-saving efforts. Thus, for example, in the event of a disaster affecting a high-rise building, first responders may spend priceless minutes endeavoring to get onto the $21^{st}$ floor although, unbeknownst to those first responders, all survivors who did not get out are located on the $23^{rd}$ floor.

Thus, the need exists for an apparatus, system and method that provides sensor-locating of persons in a building in the event of a disaster, and that first provides such information to a central dispatch or processing center, whereby such information may be provided to first responders either at dispatch or in route.

SUMMARY OF THE INVENTION

The present invention includes an apparatus, system and method that assesses the number and location of persons in a building. The present invention may include none, one, two or more emitters, at least one sensor that senses reflected radiation indicative of a modification to the emitted radiation from multiple ones of the at least two emitters, and a communicative network, wherein sensing data from the at least one doppler sensor is forwarded to a remote central hub that manipulates the sensing data to an indication of the number and the location of the persons in the building.

The sensors of the present invention may be, for example, doppler sensors, or any like sensor that senses biologically caused fluctuations within a monitored environment. Such sensors may be used in a manner to provide a triangulation of the location of the persons in the monitored environment.

The remote central hub of the present invention may indicate to at least first responders the number and the location of the persons in the building. Thereby, the present invention may allow for first responders to prepare for care of a certain number of persons, or persons having certain characteristics with regard to caregiving, or may allow for first responders to understand where to focus rescue or recovery efforts.

Thus, the present invention provides an apparatus, system and method that provides sensor-locating of persons in a building in the event of a disaster, and that first provides such information to a central dispatch or processing center, whereby such information may be provided to first responders either at dispatch or in route.

BRIEF DESCRIPTION OF THE FIGURES

The present invention will be described hereinbelow in conjunction with the following figures, in which like numerals represent like items, and wherein.

DETAILED DESCRIPTION OF THE INVENTION

Figure 1:
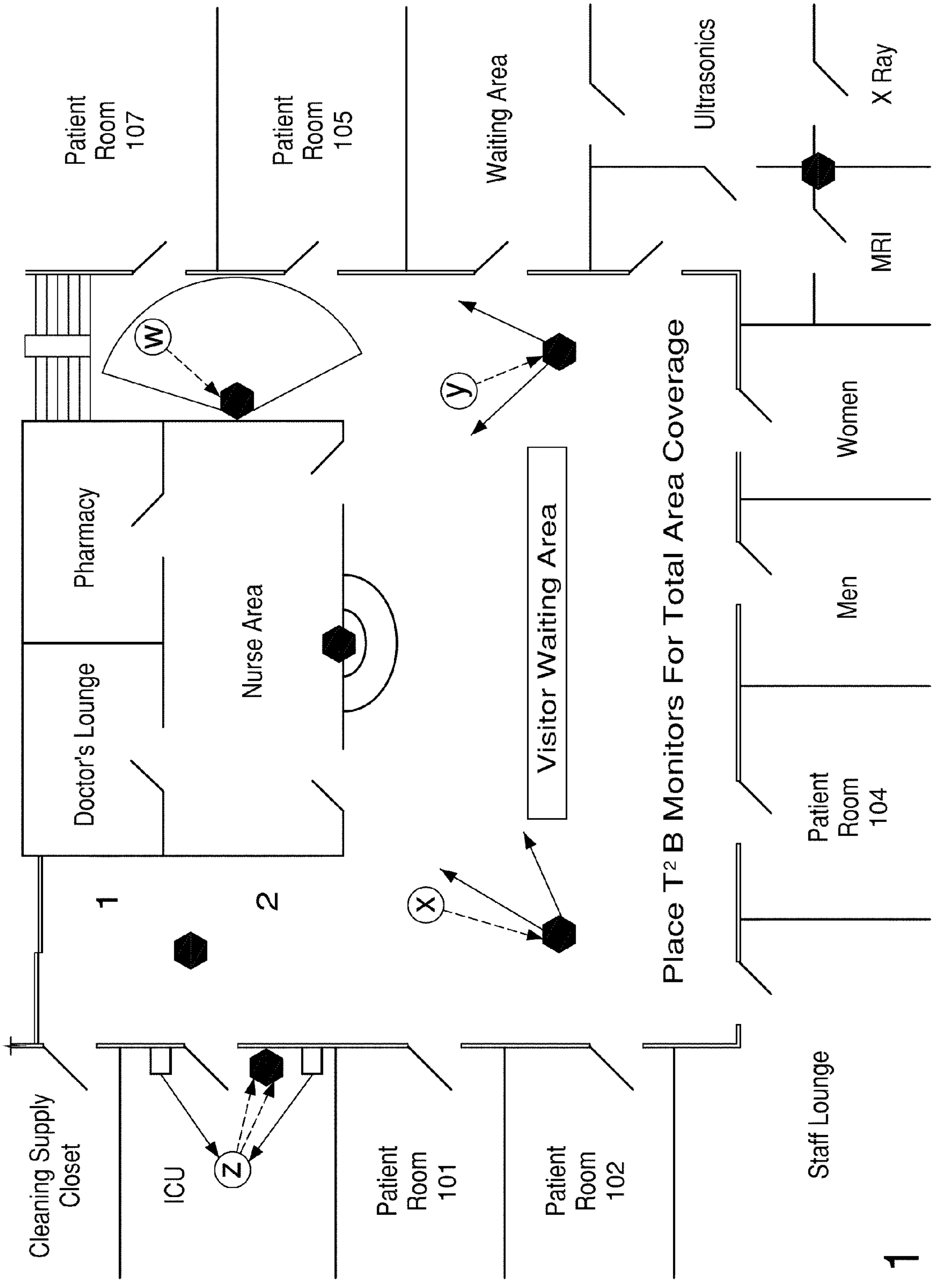
FIG. 1 illustrates an exemplary embodiment of the present invention.

It is to be understood that the figures and descriptions of the present invention have been simplified to illustrate elements that are relevant for a clear understanding of the present invention, while eliminating, for the purposes of clarity, many other elements found in typical sensing apparatuses, systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

It is frequently the case, particularly for emergency response personnel, that, in the event of a disaster, it becomes of the utmost importance to know whether there are persons remaining in a building and, if so, where those remaining persons are located. Thereby, emergency response personnel can target particular areas in order to maximize the number of lives saved, can locate survivors in the event of certain structural failures, or can locate non-survivors in the event an emergency response is unsuccessful. Further, such information allows for emergency response personnel to know the numbers of survivors, the numbers of non-survivors, and similar information. Finally, such information may be used in engineering practices, such as an order to assess where survivors are in the event of a structural failure, thereby allowing for reverse engineering to assess why those persons survived, that is, to understand what was unique about the structural components of that particular portion of structure in which those persons survived. Needless to say, such information would prove extraordinarily useful in the event of earthquake, fire, flood, terrorist attack, or other natural or manmade disaster.

The present invention provides an apparatus, system and method whereby factors ranging from the number of people, by location, in a building to the precise size and position of people within a building, may be assessed. Thus, response personnel may be informed, in real time, of the location and/or additional factors with regard to all persons at a particular location at the precise moment of any event that occurs at that location. Further, the present invention not only dynamically monitors those persons at the location of interest, but provides improved convenience over the prior art in that the present invention does not necessitate the use of RFID tags, badges, uniforms, or the like in order to allow such persons to be monitored.

The present invention may be employed in or with public or private facilities, including, for example, office buildings, schools, libraries, hospitals, or the like. As such, the present invention may be used at any time and in any place to ensure that it is known by any response personnel that persons are present, and where those persons are or were, so that no such person is left behind in the event of a disaster.

In an exemplary embodiment illustrated in FIG. 1, the present invention may be employed in a hospital environment, wherein persons are tracked moving in and out of open areas, rooms, stations, and the like. Such persons, it goes without saying, may be tracked regardless of their status, such as being tracked whether they are walking, being wheeled on a gurney, sleeping in a bed, moving in a wheelchair, or the like. Further, in certain exemplary embodiments of the present invention, not only may the presence of such persons and their location be tracked, but the status of such persons may likewise be tracked, that is, three persons in a wheel chair may be located in the east wing, and eleven of the fourteen rooms on the hospital's sixth floor may be occupied by bedridden patients. Thereby, in the event of a disaster, it is known where and how many people are located at the moment of the event, and further the status of each such person may be known as well as his or her ability to respond in the case of the disastrous event.

Additionally and alternatively, as also illustrated in FIG. 1, persons may be tracked only in certain circumstances that allow for a continuous knowledge of their respective positions. For example, in certain environments in which there is only a single point of ingress and egress to each room, such as from a hallway into each office in an office building, or into each room of a hospital, persons may be tracked only while in that hallway, and if the person disappears from the monitoring at the location of a door, it is thus known that that person is in the room correspondent to the door at which he/she left the monitoring view. Thus, because the door is the only point of ingress and egress to and from the room, it may be assumed that a person disappearing into the room is still in the room until it is sensed that the person has emerged from the room. In such an exemplary embodiment, either solely the number of persons entering a room without leaving may be used to calculate the net number of persons still in the room at a given time, without uniquely identifying those persons still in the room, or additional characteristics of each person entering the room may be monitored in order to uniquely identify who is still in the room at any given time. Thereby, in the event of a disaster, in this exemplary embodiment it is known where and how many people are located at the moment of the event, and further the status of each such person may be known as well as his or her ability to respond in the case of the disastrous event, without need of placing sensors inside every room within a building, and without expending time and/or funds monitoring inside each room of a monitored environment.

Thus, the present invention provides the ability to track the location and movement of persons in any environment that may be subject to a disaster. The system of the present invention is automatic, and thus never requires the inconvenience of RF badges, RF tags, or the like to be carried or worn by persons in the environment. The present invention is dynamic, at least in that reports may be sent in real time to remote monitoring stations, wherein the remote monitoring stations may monitor one or multiple such environments simultaneously. Additionally, although the present invention may used to identify not only the existence and movement of a person, but additionally certain characteristics of the person, the present invention may further be implemented so as to not monitor characteristics or identities of persons, such as in the event the present invention is implemented in a secure environment.

Figure 2:
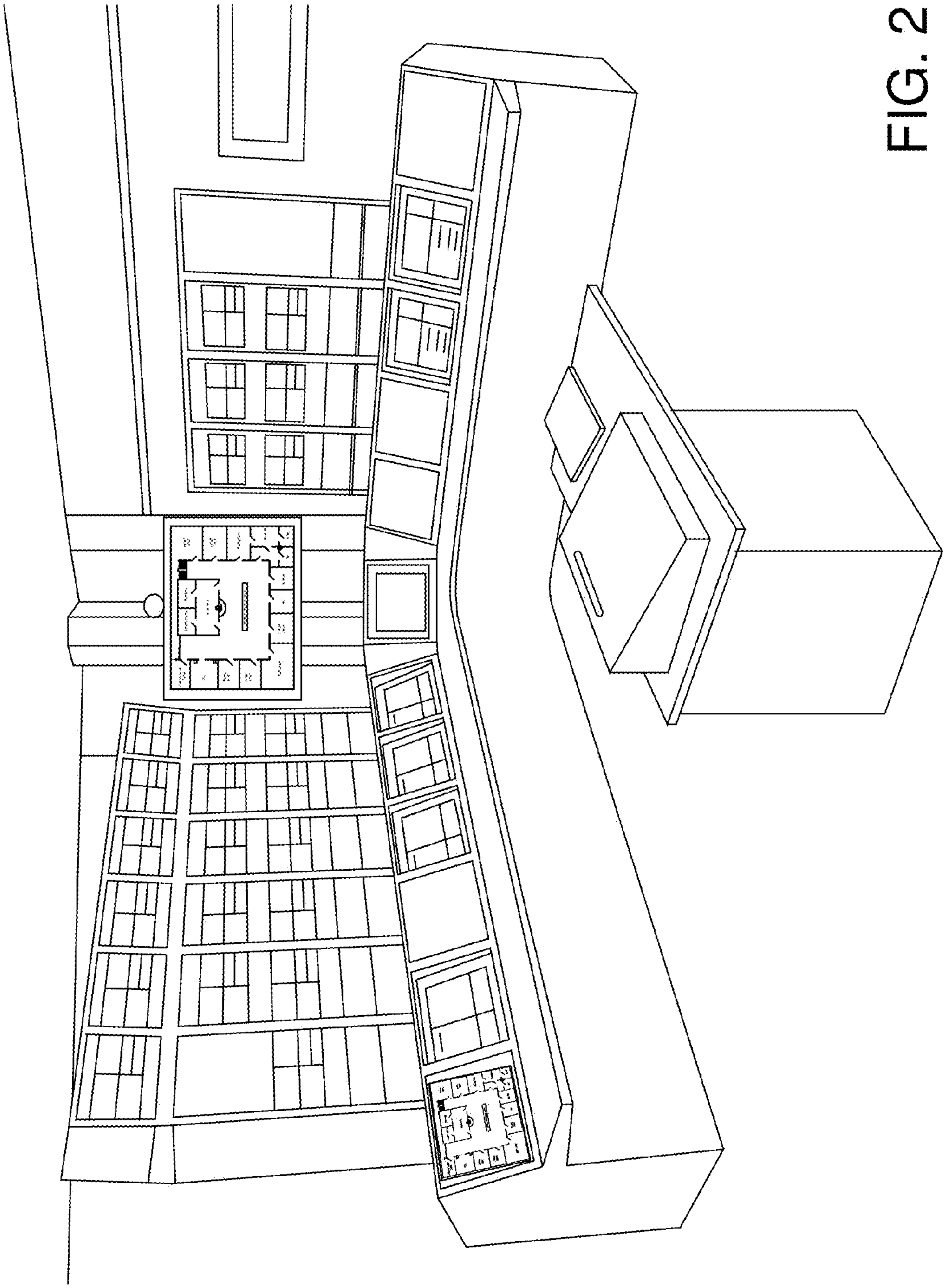
FIG. 2 illustrates an exemplary embodiment of the present invention.

The present invention may be implemented, as illustrated in FIG. 2, by a placement of a plurality of sensors and/or detectors in an environment to be monitored, and by connection of those sensors via a communication network to one or more central monitoring hubs. Those skilled in the art will understand that such communication networks would include, for example, the internet, an intranet, an extranet, a cabled communications network, a fiber optic communications network, a cellular telephone communications network, a satellite communications network, or the like. Further, those skilled in the art will appreciate that the one or more remote monitoring stations may continuously monitor each monitored environment, may periodically monitor each monitored environment, or may receive batch indications regarding each environment and may monitor such batches continuously or periodically. Of course, the monitoring stations may receive signals indicative of disasters in one or more of the monitored environments, disasters in any environment, and in so doing may receive raw signals directly from the environment sensors, or processed signals from the environment sensors, wherein such processing may be performed remotely in the monitored environment and/or may be performed at the central monitoring station upon receipt of an incoming sensor signal.

The sensors and/or detectors of the present invention may be any individual sensor and/or matched sensor-detector pairs as will be understood by those skilled in the art. Such sensors or sensor detector pairs may be used to detect, for example, biological fluctuations and biologically caused fluctuations, such as biomass, floor pressure, air pressure, heat, doppler shift, or the like, certain of which may use detection principles known to those skilled in the art, such as: radar principles, such as measuring distance using a short pulse of radio signal and measuring the time taken for a reflection to return based on the pulse sent; phase or frequency variations in return signals from a signal sent; and/or doppler shift principles, wherein radiation reflected from a moving object presents a different wavelength at a detector from the wavelength of the signal initially projected. Of course, those skilled in the art will appreciate that, employing sensors applying certain of these exemplary principles in the present invention may dictate that either the emitted radiation from the sensor/detector must be in motion relative to the target person, or the person must be moving through the emitted radiation, in order for the target person to be sensed.

In certain radar-based and/or doppler shift sensing environments, emitted radiation may occur in a fan pattern, such as in a hallway as illustrated in FIG. 1. When a portion of the fan is broken where it had been previously unbroken, it is known that a person is in that vector of the fan. Likewise, when a fan is broken in a linear sequence, and the is suddenly unbroken at the location of a doorway, it is known that a person entered the room correspondent to the known doorway. In such embodiments, it will be appreciated by those skilled in the art that beam steering and/or emitted radiation pulsing may be employed.

Similarly, in such radar-based and/or doppler shift sensing environments, triangulation may be employed in order to assess not only distance from a sensor to an object and/or movement or speed changes by an object in a particular environment, but to additionally pinpoint the specific location of a stationary or moving person within a portion of a monitored environment. In such an embodiment, radiation may be disbursed from two or more emitters, and any number of the aforementioned characteristics may be detected at one or more detectors after the disbursed radiation is reflected from the one or more persons or objects within the portion of the environment being monitored. Such radiation disbursements may be constant, pulsed, or on only upon occurrence of a triggering event, such as a disaster. Likewise, the detection may be constant pulsed, or only upon occurrence of a triggering event.

Needless to say, in an embodiment wherein vectoring and/or triangulation, is performed, it is preferred that the emitted signal not be of the same frequency for more than one of any proximate group of multiple radiation emitters. That is, for example, in an exemplary embodiment in which two emitters and one detector are employed, each of the emitters emits at a different frequency such that a single detector can sense the return signal for each frequency separately, and thereby assess, for example, a doppler shift and/or a distance to one or more persons in the monitored environment, and thereby triangulate the location of a person within the monitored environment. Similarly, if multiple emitters are placed in a hallway with overlapping fields in order to present optimal beam coverage of the hallway, such overlapping fields may preferably be of different frequencies.

In an exemplary environment, 24 GHz and/or 60 GHz doppler, or similar microwave level radiation, may be employed, and a spread may be assigned to the emitted radiation to best ensure that persons at various locations without a monitored environment, and of variable heights, may be sensed through the use of the present invention. Thus, for example in the aforementioned exemplary embodiment, a one degree spread may be employed. Further, particularly in microwave embodiments of the present invention, it is preferable that only low power radiation be employed, such as in the range of 5 mW. Additionally and alternatively, other frequency ranges may be used in the present invention, such as to avoid interference with equipment in a monitored environment. For example, ultrasound frequencies may be employed in hallways in a hospital environment, such as in order to avoid interference with caregiving equipment. It almost goes without saying that the aforementioned frequencies, spread and/or power levels are exemplary in nature, and myriad other frequencies, spreads and/or power levels may be employed with the present invention.

Additionally, as will be understood by those skilled in the art in light of the discussion herein, multiple vertical levels of the aforementioned vectoring and/or triangulation may be employed, such as to provide a vertical axis to monitor the height of persons within an environment. Through the use of a vertical axis, persons situated in different circumstances, such as in a hospital at wheelchair height, at gurney height, or at adult standing height, may be uniquely assessed and/or identified.

In additional and alternative embodiments, vectoring and/or triangulation may be employed using multiple direct biosensors. For example, two biosensors that sense, for example, electromagnetic energy emitted from persons in a monitored environment, heat emitted from persons in a monitored environment, or pressure changes produced in a monitored environment, may be calibrated and used to assess, for each sensor, distance to the person causing the environmental change. Thereby, triangulation may be employed using the two or more sensors, of the same or different types, to locate the one or more persons in the monitored environment.

Figure 3:
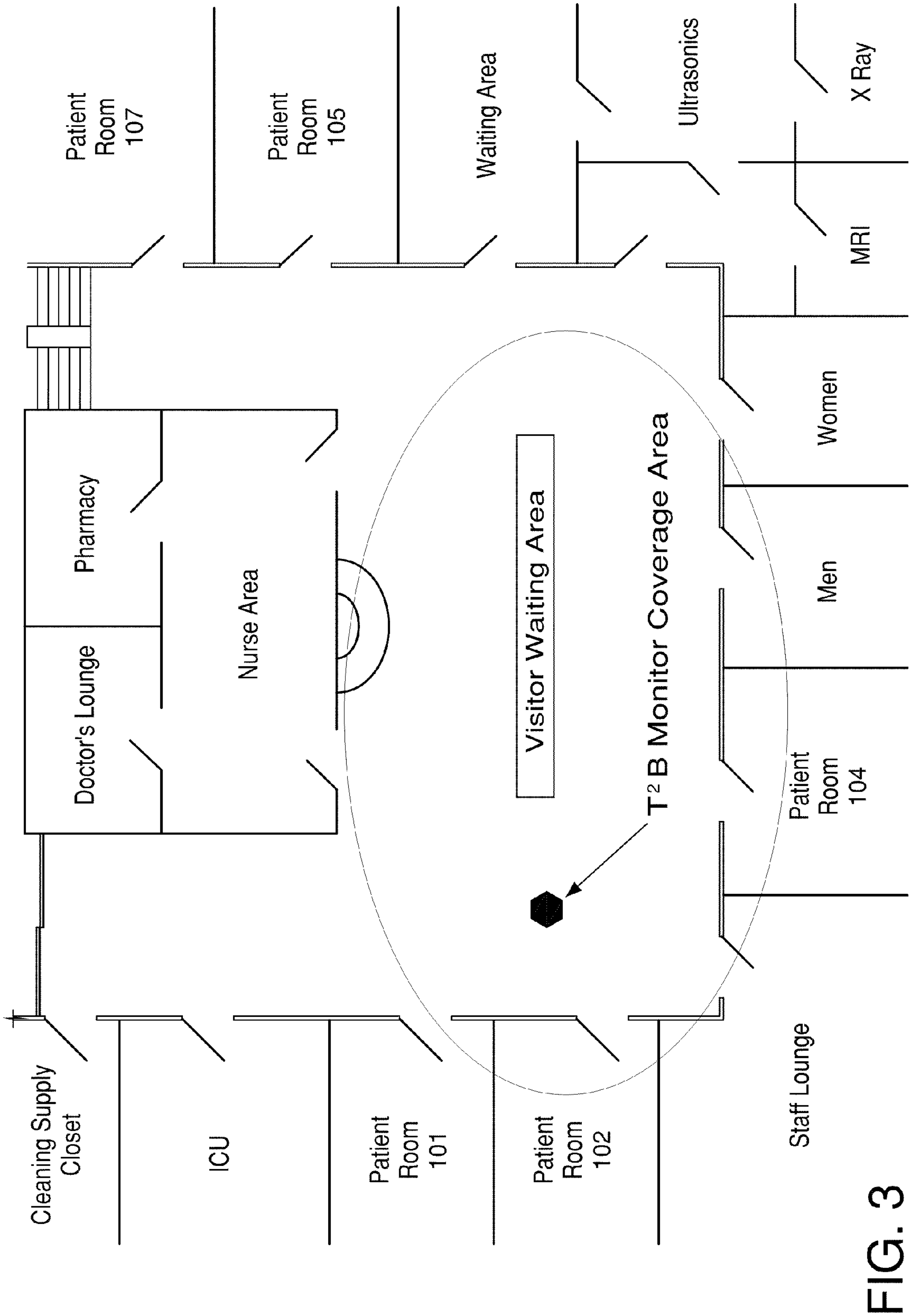
FIG. 3 illustrates an exemplary embodiment of the present invention.
Figure 4:
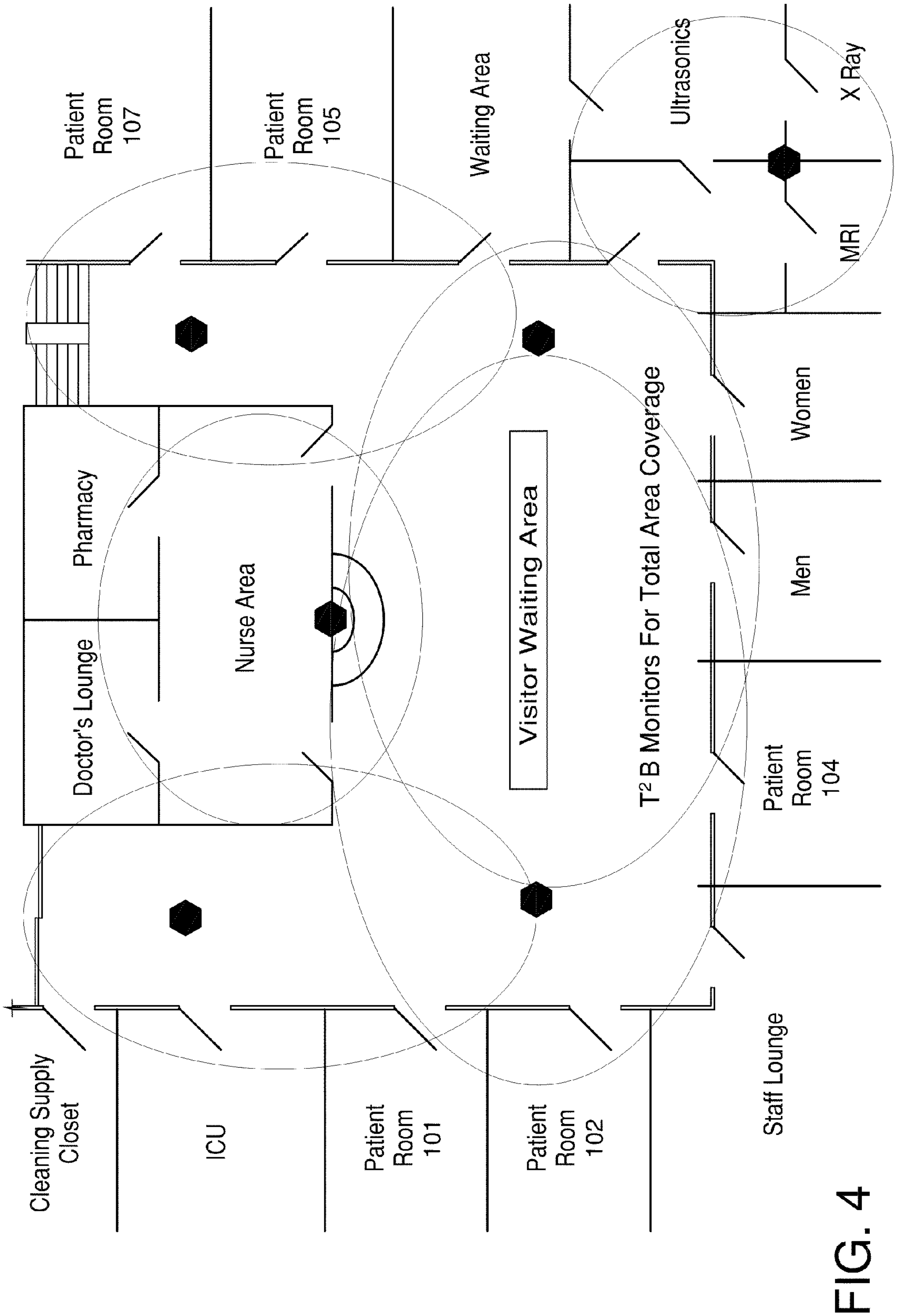
FIG. 4 illustrates an exemplary embodiment of the present invention.

In the exemplary embodiment of the present invention illustrated in FIG. 3, a sensing unit for a matching sensing-detector pair is placed in a particular coverage area on the ground floor of a hospital. FIG. 4 illustrates an embodiment wherein multiple sensors and/or sensor detector pairs are placed throughout the ground floor of a hospital environment in order to improve coverage area. Of note, with respect to FIG. 4, it may be preferred that multiple sensors and/or sensor detector pairs may be used in order to create overlapping fields, thereby ensuring that no locations in a particular coverage area go unmonitored through the use of the present invention.

Figure 5:
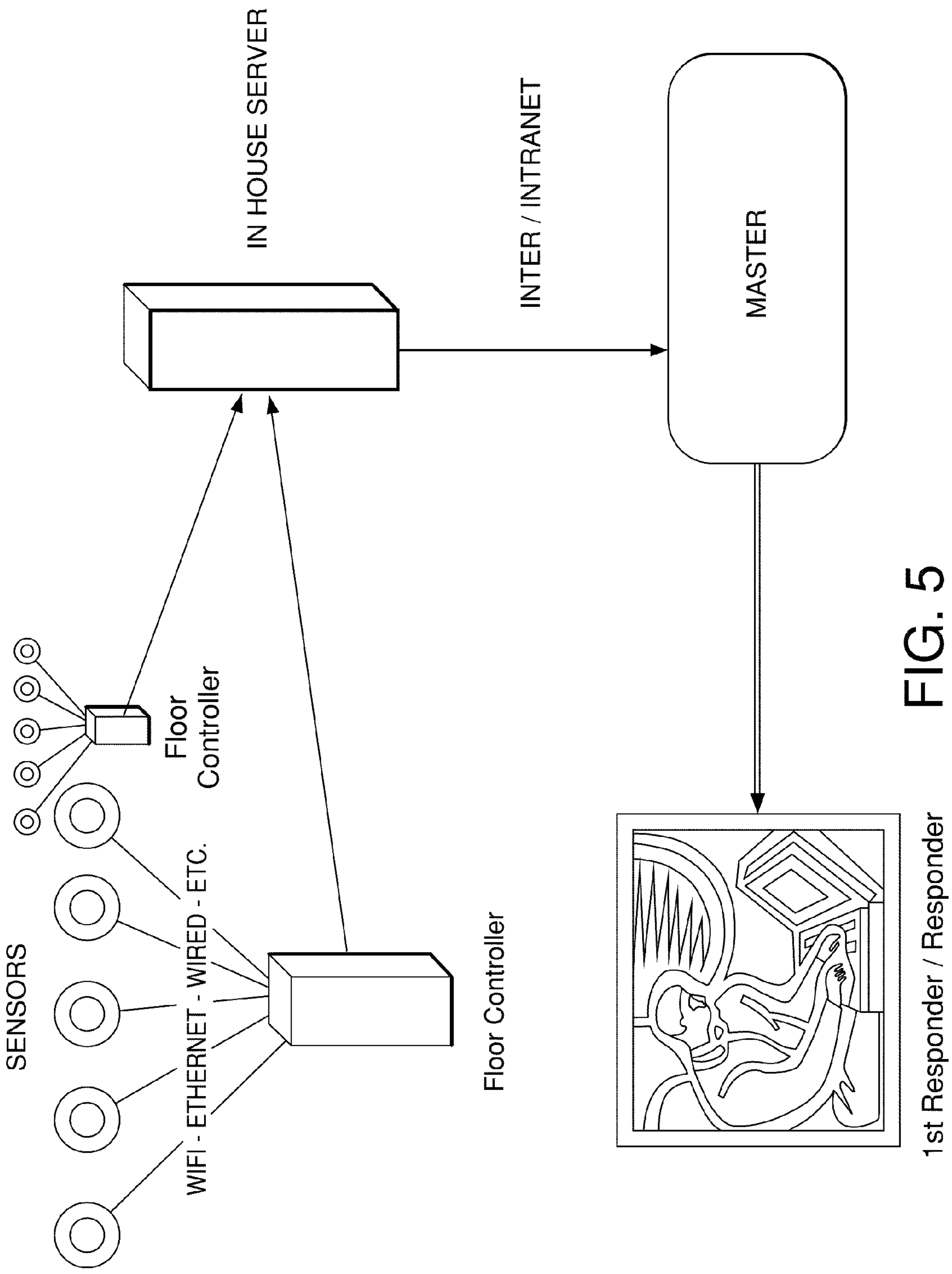
FIG. 5 illustrates an exemplary embodiment of the present invention.

FIG. 5 illustrates an exemplary embodiment in which a dispatcher for first responders monitors the monitored environment through the use of the present invention, such as through the use of the monitoring station illustrated in FIG. 2. In the illustrated exemplary environment, multiple sensors and/or sensor detector pairs are controlled by a "floor controller", wherein the floor controller may be one of multiple floor controllers that locally or substantially locally control the sensors within one or more buildings and/or monitored environments. The floor controllers may include signal processing capabilities, and may communicate with one or more in-house servers, wherein the one or more in-house servers may be any server or server type known to those skilled in the art. The in-house server, to the extent included in this exemplary embodiment, may then communicate with an external server that in turn communicates with a first response dispatcher. The remote external server may communicate with the in-house server via any wired or wireless communication methodology known to those skilled in the art. Likewise, the floor controller may communicate with the sensors via any wired or wireless communication technologies known in the art, and each floor controller may communicate via available wired or wireless technologies known in the art with the in-house server.

Figure 6:
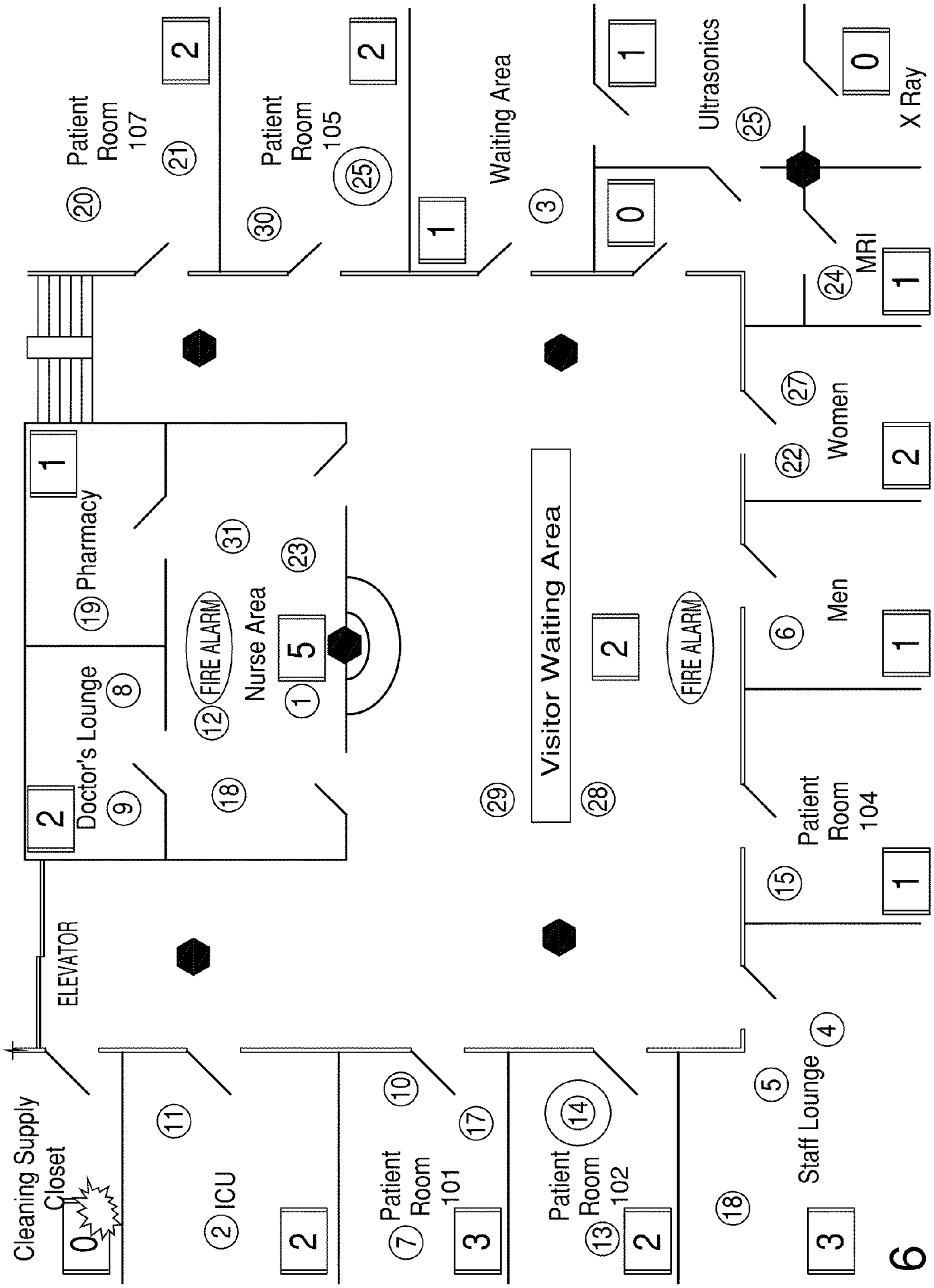
FIG. 6 illustrates an exemplary embodiment of the present invention.

FIG. 6 illustrates an embodiment of the present invention wherein a fire has occurred in the area referred to as a cleaning supply closet. The fire alarm in the hospital has sounded, and each person within the building upon occurrence of the fire and sounding of the fire alarm is referenced in FIG. 6 by a particular number. Following the occurrence of the fire alarm, those persons referred to by an uncircled number in their most recent location have escaped the building. However, those persons referred to by numbers with a white circle around the number in FIG. 6 represent persons who did not escape the building, and thus are presumably in or near the last referenced location illustrated in FIG. 6. Thereby, first responders responding to the fire at the hospital may receive the information of any parties, and the location of those parties, who not escape the building upon occurrence of the fire alarm. Such information may, for example, be telephonically or otherwise relayed to the first responders, or, through the use of the detailed map GUI feature of the present invention, may be downloaded in an environment map format to the first responders while the first responders are enroute to the disaster location.

It will be understood to those skilled in the art that the use of the present invention may include preliminary setup of the sensors and/or sensor detectors of the present invention in empty rooms, such as to assess the location of background noise, interference, furniture or other stationery objects, other sensors, walls, doorways, and the like, so that such items may be accounted for to eliminate false alarms and/or non-alarms when the present invention is employed. For example, signal processing capabilities and/or software, including the user interface software illustrated in FIGS. 3, 4, and 6, may be implemented with false alarm and/or non-alarm eliminating capabilities. Thereby, the sensors and/or sensor detector pairs of the present invention may be themselves used to assess those items likely to cause false alarms or non-alarms, or a preliminary map of such items may be downloaded to the software of the present invention in order to allow for such an assessment.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention and the claims appended hereto.

What is claimed is:

1. A system that assesses the number and location of persons in a building, comprising:

at least two emitters;

at least one doppler sensor entirely inside the building-that senses reflected radiation indicative of a reflection off of at least one person of emitted radiation from multiple ones of the at least two emitters; and a communicative network, wherein sensing data from at least one doppler sensor at the building is forwarded to a remote central hub that manipulates an absence of the sensing data from ones of the at least one doppler sensor to an indication of the number and the location of the persons in the building;

wherein the remote central hub indicates to at least first responders the number and the location of the persons in the building.

2. The system of claim 1, wherein the location further comprises an indication of a physical factor of each of the persons in the building.

3. The system of claim 1, wherein the indication to first responders comprises a real time indication.

4. The system of claim 1, wherein the building comprises one selected from the group consisting of an office building, a school, a library, and hospitals.

5. The system of claim 1, wherein the at least two emitters and at least one sensor comprise a triangulation.

6. The system of claim 5, wherein the triangulation comprises a horizontal plane triangulation.

7. The system of claim 6, wherein the horizontal plane comprises a spread from each of the at least two emitters about the horizontal plane.

8. The system of claim 7, wherein the spread comprises one degree.

9. The system of claim 1, wherein the communication network comprises at least one selected from the group consisting of the internet, an intranet, an extranet, a cabled communications network, a fiber optic communications network, a cellular telephone communications network, and a satellite communications network.

10. The system of claim 1, wherein the sensing data is forwarded to the remote central hub at least one of continuously, periodically, or by batch.

11. The system of claim 1, wherein the sensing data forwarded comprises raw data.

12. The system of claim 1, wherein the sensing data forwarded comprises processed data.

13. The system of claim 1, wherein one of the at least two emitters comprises one selected from the group consisting of a 24 GHz emitter and a 60 GHz emitter.

14. A system that assesses the number and location of persons in a building, comprising:

at least two biological fluctuation sensors solely within the building, wherein each of said at least two biological fluctuation sensors are located in at least two separate portions of the building; and a communicative network, wherein sensing data from each of said at least two biological fluctuation sensors is forwarded to a remote central hub that manipulates an absence of the sensing data to an indication of the number and the location of the persons in the building;

wherein the remote central hub indicates to at least first responders the number and the location of the persons in the building.

15. The system of claim 14, wherein the biological fluctuations comprise at least one of biomass, floor pressure, air pressure, heat, and emitted electromagnetic field.

16. The system of claim 14, wherein the biological fluctuation comprises a reflection.

17. The system of claim 16, wherein the sensing data comprises a time for the reflection to return to a sensor after emission from an emitter.

18. The system of claim 16, wherein the sensing data comprises a phase variation in the reflection from an emission by an emitter.

19. The system of claim 16, wherein the sensor data comprises a frequency variation in the reflection from an emission by an emitter.

20. The system of claim 16, wherein the reflection comprises a doppler shift.

21. The system of claim 14, wherein the sensing data comprises a triangulation of at least two biological fluctuation sensors.

22. A system that assesses the number and location of persons in a building, comprising:

at least two emitters located within the building to provide coverage of a corridor;

at least one doppler sensor entirely inside the building that senses reflected radiation indicative of a reflection off of at least one person of emitted radiation from multiple ones of the at least two emitters; and a communicative network, wherein sensing data from at least one doppler sensor at the building is forwarded to a remote central hub that manipulates an absence of the sensing data from ones of the at least one doppler sensor to an indication of the number and the location of the persons in the building;

wherein the remote central hub indicates to at least first responders the number and the location of the persons in the building, and wherein absence of the sensing data from ones of the at least one doppler sensor is indicative of at least one person exiting the corridor.

* * * * *